United States Patent [19]

Bates

[11] Patent Number: 4,507,657
[45] Date of Patent: Mar. 26, 1985

[54] APPARATUS FOR DETERMINING VARIOUS OPERATIONAL CONDITIONS OF AN AIRCRAFT

[76] Inventor: Kenneth C. Bates, 28 Scenic Dr., Poughkeepsie, N.Y. 12603

[21] Appl. No.: 549,159

[22] Filed: Nov. 7, 1983

[51] Int. Cl.³ ............................................. G08G 5/00
[52] U.S. Cl. .................................. 340/959; 73/178 T; 340/963; 364/426; 364/427
[58] Field of Search ............... 340/949, 959, 963, 964, 340/968; 73/57, 178 T, 182; 244/181, 182; 200/61.52, 61.53; 364/426, 427, 434, 435

[56] References Cited

U.S. PATENT DOCUMENTS

| | | | |
|---|---|---|---|
| 3,204,233 | 8/1965 | Olliff | 200/61.52 |
| 3,288,240 | 11/1966 | Franzel | 200/61.52 |
| 3,296,998 | 1/1967 | Kirk | 200/61.52 |
| 3,348,792 | 10/1967 | Porter | 200/61.52 |
| 3,504,335 | 3/1970 | Hall | 340/959 |
| 3,601,729 | 8/1971 | Hierta | 200/61.52 |
| 3,748,415 | 7/1973 | Suzuki | 200/61.52 |
| 3,909,569 | 9/1975 | Jones | 200/61.53 |
| 4,044,975 | 8/1977 | Blechen | 340/959 |
| 4,250,746 | 2/1981 | Vassie | 73/178 T |
| 4,251,868 | 2/1981 | Aron | 340/959 |

OTHER PUBLICATIONS

Aviation Week & Space Technology—May 2, 1983, p. 34.
Aviation Week & Space Technology—Nov. 1, 1982, pp. 92, 93, 95.
Aviation Week & Space Technology—Dec. 13, 1982, p. 110.
Aviation Week & Space Technology—Dec. 20, 1982, p. 82?.
Aviation Week & Space Technology—Feb. 7, 1983, p. 94.
Aviation Week & Space Technology—Feb. 14, 1983, p. 138.
Aviation Week & Space Technology—Feb. 28, 1983, p. ?.

Primary Examiner—James J. Groody
Assistant Examiner—Michael F. Heim
Attorney, Agent, or Firm—John Maier, III

[57] ABSTRACT

An apparatus for determining various operational conditions of an aircraft such as acceleration, deceleration, angle of attack and wind shear.

12 Claims, 9 Drawing Figures

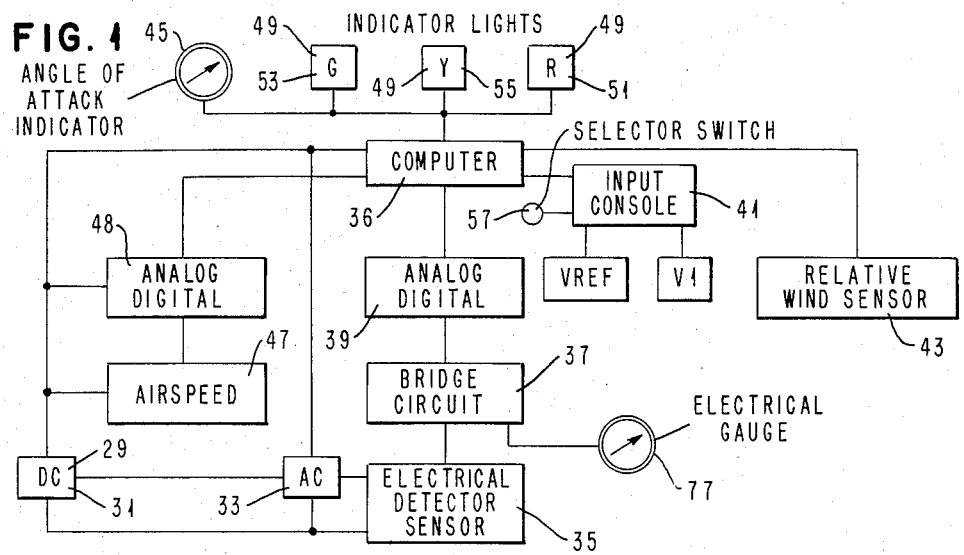
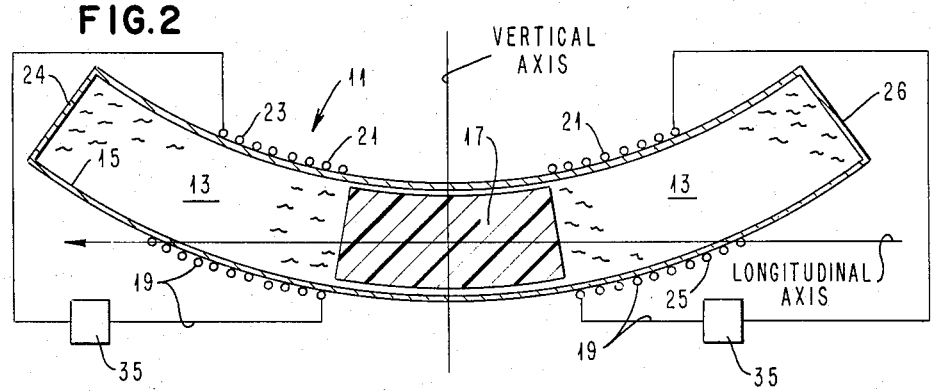
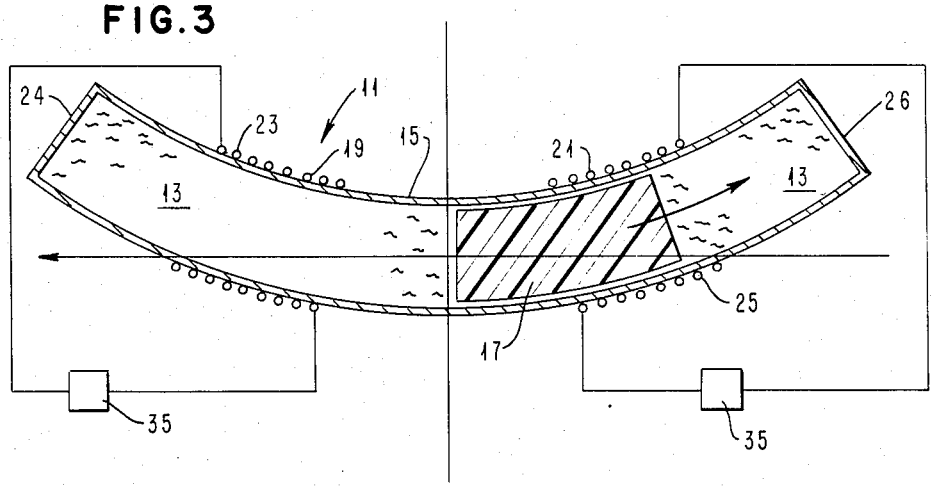

A = PITCH ANGLE
B = RELATIVE WIND ANGLE
C = ANGLE OF ATTACK

APPARATUS FOR DETERMINING VARIOUS OPERATIONAL CONDITIONS OF AN AIRCRAFT

FIELD OF THE INVENTION

This invention relates generally to an apparatus for determining various operational conditions of an aircraft such as acceleration, deceleration, angle of attack and wind shear. Such operational conditions as wind shear, acceleration during take off and deceleration after landing as well as the angle of attack of the wing are essential for safe and efficient flight. A system, however, which integrates all possible factors is not available. As for example, acceleration rate and change for take off, is vital to safe take off procedure but private and commercial aircraft operate without this vital performance information because there is no practical system which functions reliably notwithstanding such adverse factors such as snow, ice or standing water being present on the runway as well as other such factors as improper power settings, degraded engine power, dragging brakes, underinflated tires or blown tires. A similar system is needed for virtually the same reasons during deceleration upon landing. Similarly the angle of attack of the wing for various rake off weights and speeds is essential for efficient aerodynamics during lift off, climb, cruise and descent.

During take off, it is known that an aircraft must achieve a specified speed within a specified distance if a safe take off is to be accomplished. The exact speed and distance is determined by the design of the aircraft as well as the weight being carried by the aircraft as well as the runway length and altitude along with a large variety of factors. Currently, only specified control requirements are provided such as trottle setting in the belief that use of the prescribed aircraft operating conditions will produce the needed speed in the distance allowed. Under ideal conditions, this is probably true but frequently ideal conditions are not available.

Air speed, distance and time can be measured. However, this data is not being fully utilized to assess acceleration on a time basis. If the speed is not of the needed value when the specified distance has been traversed, the remaining runway is insufficient; particularly following even a brief period of indecision by the pilot, for the aircraft to reach the end of the runway before it can be stopped safely. Therefore, it is important for the pilot to be able to monitor acceleration immediately from the moment the aircraft begins its take off so as to know that the aircraft is accelerating properly and the pilot can still abort the take off safely.

In landing with deceleration, the situation is similar. On touching down, the pilot needs to know if he is decelerating at a rate that he can safely stop the aircraft. By knowing immediately on landing, should the deceleration rate be inadequate, the pilot will be cued to take corrective action.

The principal object of this invention is to provide an apparatus which will selectively provide to the pilot of an aircraft an accurate assessment of various conditions of the aircraft such as acceleration during take off, deceleration after landing, angle of attack of the wing and wind shear. Another object of the invention is to provide an apparatus which will provide to the pilot of an aircraft during take off an accurate assessment of the acceleration of the aircraft in real time to assure the pilot that the required take off speed is being accomplished at any intermediate distance and time.

Another object of the invention is to furnish to the pilot of an aircraft an accurate assessment of the deceleration of the aircraft within a specified distance and time after landing.

Another object of the invention is to provide to the pilot of an aircraft an accurate determination of the angle of attack of the wing during various phases of flight.

Another object of the invention is to warn of potential wind shear.

Other objects of this invention will in part be obvious and in part hereinafter pointed out.

The invention clearly consist of features of construction, combination of elements and arrangement of parts which will be exemplified in the construction hereinafter described of which the scope of application will be indicated in the following claims.

SUMMARY OF THE INVENTION

This invention resides in an apparatus for determining various operational conditions of an aircraft such as acceleration, deceleration, angle of attack and wind shear. An elongated container having a substantially constant cross-sectional area is curved along its longitudinal axis. The container is filled with a fluid. A block is located in the container and is immersed within the fluid. The block is made from a material having a greater density than the density of the fluid. At a position away from the center of the elongated container, a coil is wrapped around the elongated container and is supplied with electrical energy to create a flux field. Acceleration, deceleration as well as rotation of the container from the horizontal will cause the block to move through the fluid into the flux field which changes the characteristics of the flux field, thereby providing an electrical value for indicating the operational conditions of the aircraft.

The novel features which are considered as characteristics of the invention are set forth with particularity in the appending claims. The invention itself, however, as to its construction and obvious advantages, will be best understood from the following description of the specific embodiment when read with the accompanying drawings.

BRIEF DESCRIPTION OF THE DRAWINGS

In the accompanying drawings, wherein like reference numerals identify the same or like part, there are shown the preferred embodiments of this invention.

FIG. 1 is a schematic representation of the meter sensor in combination with a computer and various other known sensors and inputs as well as indicator means to indicate the function being monitored by the meter and analysed by the computer with the other data supplied to the computer.

FIG. 2 is a longitudinal cross-sectional view of the horizontal meter with the block at zero displacement and with a pair of inductance coils and with the circuitry from each of the coils shown schematically.

FIG. 3 is a longitudinal cross-sectional view of the horizontal meter similar to FIG. 2 but with the block displaced rearwardly.

DESCRIPTION OF THE PREFERRED EMBODIMENT

Figure 4:
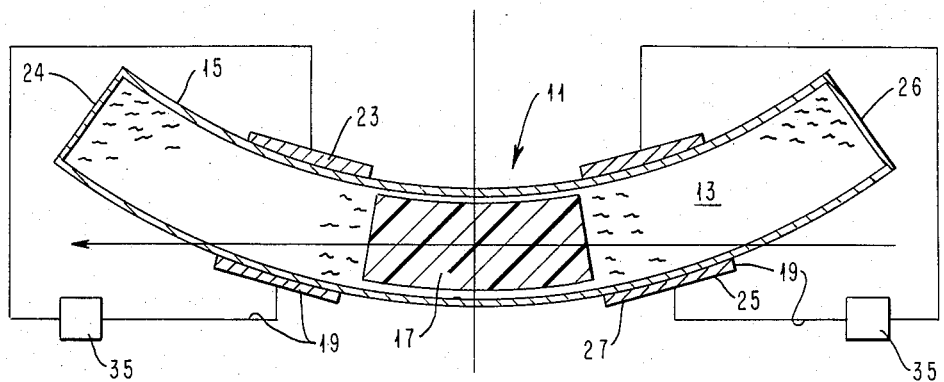
FIG. 4 is a longitudinal cross-sectional view of the horizontal meter with the block at a zero displacement and with two sets of capacitance plates and with the circuitry from each set of capacitance plates shown schematically.

Referring now to the drawings and more particularly to FIG. 2, there is shown a meter 11 including only a horizontal meter 13 in accordance with this invention. The horizontal meter 13 includes a horizontal container 15 which is elongated and is sealable but has some closable opening (not shown) to permit filling of the horizontal container 15 with a fluid. The horizontal container 15 is curved about its vertical axis and along its longitudinal axis.

The horizontal container 15 is filled with a fluid and a horizontal block 17 is movably located within the horizontal container 15. The cross-sectional area of the horizontal container 15 can vary. As for example, the cross-sectional area of the horizontal container 15 may either be rectangular or circular but the cross-sectional shape of the horizontal block 17 and the horizontal container 15 are preferably the same and both the horizontal block 17 and the horizontal container 15 would normally have the same radius of curvature. The cross-sectional dimensions of the horizontal block 17 should be slightly less than the cross-sectional dimensions of the horizontal container 15 so that the horizontal block 17 can readily move within the horizontal container 15. The density of the horizontal block 17 is greater than the density of the fluid in which it is immersed within the horizontal container 15 so that when the horizontal container 15 is not under acceleration or deceleration and is generally horizontal along its longitudinal axis, the horizontal block 17 will be centrally located in the horizontal container 15 under the influence of gravity. Located off center, apart from each other substantially the length of the horizontal block 17 itself is an electrical detecting means 19 including a pair of induction coils 21.

A coil 21, as depicted, in FIG. 2 is disposed near each end of the horizontal container 15. Normally, there is a forward coil 23 or forward electrical detecting means 23 located near the forward end 24 of the horizontal meter 13 and a rearward coil 25 or rearward electrical detecting means 25 located near the rearward end 26 of the horizontal container 15. For example, in deceleration the forward coil 23 would be used, while in acceleration, the rearward coil 25 would be used. However, in certain applications, such as acceleration or deceleration, only one such coil 21 is necessary for the operation of the horizontal meter 13. An alternate embodiment, shown in FIG. 4, utilizes capacitance plates 27 rather than induction coils 21 and therefore, instead of a pair of induction coils 21, uses two sets of capacitance plates 27. One pair of capacitance plates 27 can be used in place of each induction coil 21 in any of the applications and wherever reference is made herein to induction coils 21, one pair of capacitance plates 27 could be used instead.

Each of the induction coils 21 or sets of capacitance plates 27 is supplied electrical energy from a power source 29 which can be a direct current source 31 in combination with a converter 33 to convert to alternating current. The circuit for each induction coil 21 or set of capacitance plates 27 includes a sensor 35, for sensing flux or capacitance change, and a computer 36 (best seen in FIG. 1). Power to the induction coil 21 or capacitance plates 27 is supplied through the sensor 35. The sensor 35 used for detecting both the change in capacitance and the change in inductance would connect to a bridge circuit 37 which will supply an analog voltage to an analog digital converter 39 which in turn will supply the converted data on the specific aircraft function to the computer 36. Also connected to the computer 36 is a data input console 41, a relative wind sensor 43, an angle of attack indicator 45, an air speed input 47, an air speed analog digital converter 48 and a series of indicator lights 49. The number, style and color of the indicator lights 49 can vary, but a red 51, green 53 and yellow 55 light are shown in FIG. 1.

The meter 11 can be used selectively in various ways and more than one meter 11 may be located in an aircraft for various purposes. A selector switch 57 is located on the data input console 41 to permit the pilot to select the function desired. Normally only one function is used at a time. Therefore, the horizontal meter 13 has the same description but can have varying functions depending on how the horizontal meter 13 is used on the aircraft and which data it supplies to the computer 36. When the horizontal meter 13 is used, however, for wind shear evaluation, a vertical meter, 59, to be subsequently described, is used in conjunction with the horizontal meter 13.

Starting with the use of the horizontal meter 13 as an accelerometer, the horizontal meter 13 is located in the aircraft with its longitudinal axis along the longitudinal axis of the aircraft. As the aircraft accelerates during take off, the horizontal block 17 will move to the rear of the horizontal container 15 and the greater the acceleration the further the horizontal block 17 will move rearwardly into the horizontal container 15. The length of the horizontal block 17 is such that with zero acceleration, the horizontal block 17 will not enter the flux field of the rearward coil 21 located toward the rear of the horizontal container 15. Similarly, with zero deceleration, the horizontal block 17 will not enter the forward coil 23. At maximum acceleration or deceleration the horizontal block 17 will move progressively into the sensing field of the respective electrical detecting means 19.

When the meter 11 is being utilized as an accelerometer, the meter 11 itself, the data input console 41, the airspeed sensor 47 as well as the indicator lights 49 are used. The signal from the air speed sensor 47 is supplied to an analog digital converter 48 before being supplied to the computer 36. The meter 11 supplies to the computer 36 the change in flux or capacitance as a measure of the actual rate and change of acceleration. The data input console 41 provides to the computer certain facts such as the weight of the aircraft, factors which comprise the V(1) speed, which is a series of performance factors reduced to a simple operational speed and distance. The computer 36 is programmed to integrate these various factors to determine whether the take off is a go or no-go situation prior to reaching the V(1) speed. A go situation is indicated by the green light 53, no-go by the red light 51, while the yellow light 55 indicates a border-line situation. V(1) is a speed to be reached by the aircraft in take off within a specified distance. The actual values are determined from aircraft design and runway conditions such as length and altitude. For more details on V(1), which is a value currently used in day to day aircraft operation, reference is made to the FAA approved flight manual.

Figure 5:
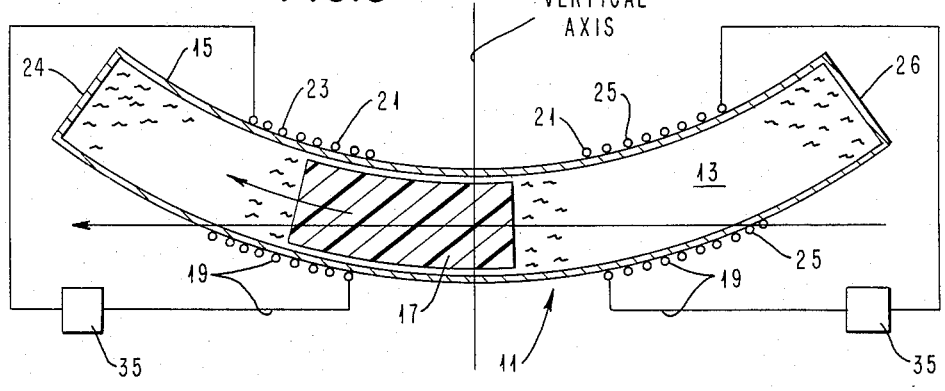
FIG. 5 is a longitudinal cross-sectional view of the horizontal meter similar to FIG. 3 but with the block displaced forwardly.
Figure 6:
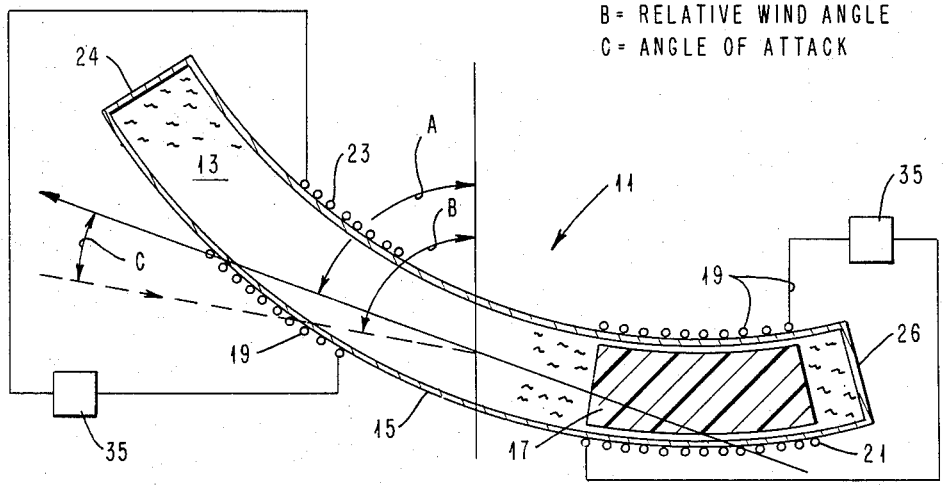
FIG. 6 is a longitudinal cross-sectional view of the horizontal meter inclined from the horizontal to determine the angle of attack showing the angle from the vertical to the longitudinal axis of the meter and the angle of the relative wind; and with the block displaced rearwardly, the circuitry for the pair of inductance coils be ing shown schematically.

When the horizontal meter 13 is used as a decelerometer, as shown in FIG. 5, it is also installed in the aircraft along the longitudinal axis of the aircraft. With two electrical detecting means 19, shown with induction coils 21, on the horizontal container 15, the same horizontal meter 13 would be used for both acceleration and deceleration. Upon deceleration after landing, the horizontal block 17 will move toward the forward end 24 of the horizontal container 15 and into the forward coil 23. The greater the rate of deceleration, the further the horizontal block 17 will move into the forward electrical detecting means 23. The change in the flux field or capacitance caused by the presence of the horizontal block 17 within the forward electrical detecting means 23 is supplied to the computer along with the factors supplied through the data input console 41. However, with deceleration a V(REF) value is supplied to the computer 36. This value like the V(1) value is a known and available number for each combination of aircraft design and landing facilities and is available from an FAA approved flight manual. As with the acceleration, the pilot is supplied with the practical analysis by means of the indicator lights 49.

When the meter 11 is used to determine angle of attack, it is again located in the aircraft along the longitudinal axis of the aircraft. When there is no angle of attack, the horizontal block 17 will be located centrally within the horizontal meter 13. However, the angle of attack of the wing will be measured by the degree of displacement of the horizontal block 17 into the electrical field of the rear electrical detecting means 19 when the aircraft is inclined with the nose of the aircraft directed upwardly and into the forward coil if the nose is inclined downwardly. Once again, the greater the angle of either incline or decline of the aircraft on its plane of motion, the greater will be the electrical change of the rear electrical detecting means 19 or forward electrical detecting means 23, which will provide a signal to the computer 36 indicating the angle. When the horizontal meter 13 is used to determine angle of attack, it is used in conjunction with the computer 36 and the relative wind sensor 43 to provide the angle of attack on the angle of attack indicator 45. The horizontal meter 13 determines the longitudinal pitch angle A and the relative wind sensor 43 determines the relative wind angle B which, when subtracted from the longitudinal pitch angle A, gives the angle of attack C.

Figure 7:
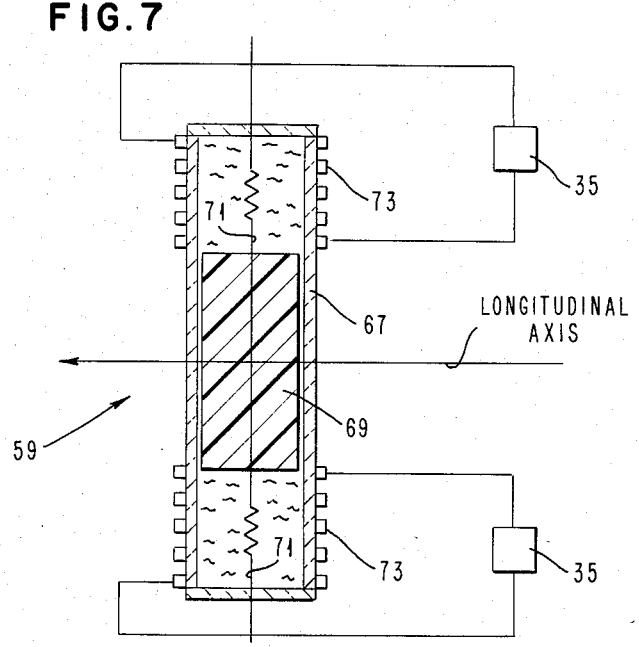
FIG. 7 is a vertical cross-sectional view of a vertical meter used to determine wind shear with the block shown in the position of zero displacement and with two inductance coils, the circuitry for the inductance coils being shown schematically.
Figure 8:
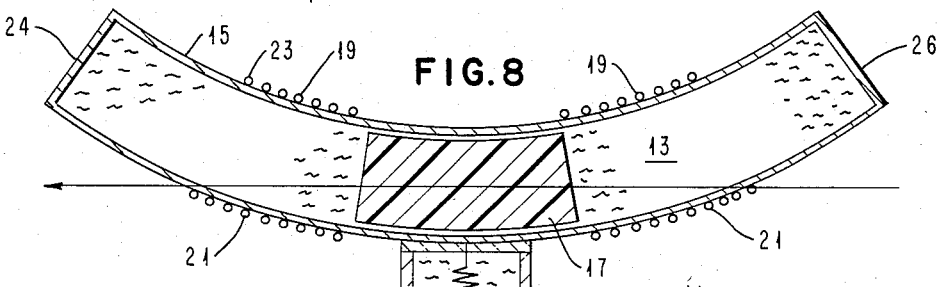
FIG. 8 is a cross-sectional view of the meter showing the horizontal meter with inductance coils in combination with the vertical meter with capacitance plates with the block in the horizontal meter located at zero displacement and with the block of the vertical meter located upwardly due to a wind shear displacement of the aircraft downwardly.
Figure 9:
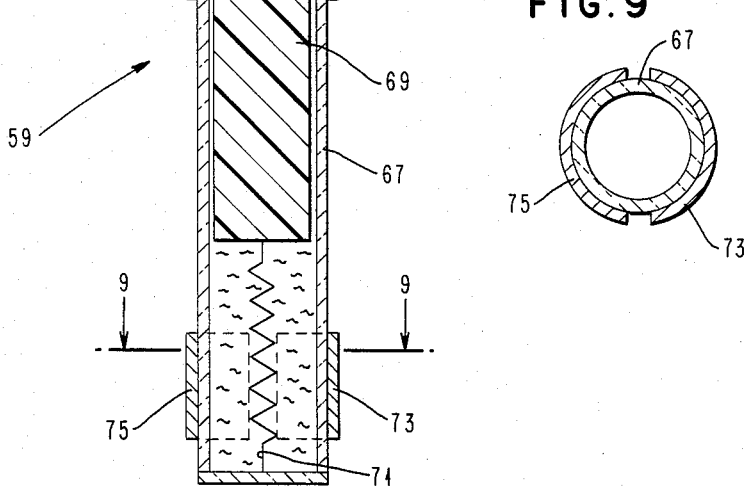
FIG. 9 is a cross-section taken along line 9—9 of FIG. 8.

The horizontal meter 13 can also be used to detect wind shear when used in conjunction with the vertical meter 59 best seen in FIGS. 7, 8 and 9. The vertical meter 59 includes a vertical container 67 which is straight along its longitudinal axis and the longitudinal axis of the vertical container 67 is mounted along the vertical axis of the aircraft. Once again, the horizontal meter 13 is mounted in the aircraft with its longitudinal axis along the longitudinal axis of the aircraft. The vertical meter 59 need not be physically combined with the horizontal meter 13 to form a wind shear meter as shown in FIG. 8 but may be remotely located in the aircraft. A vertical block 69 is centrally suspended by a resilient spring means 71 to both ends of the vertical container 67. The vertical container 67 preferably is filled with a fluid to damp the movement of the vertical block 69. The electrical detecting means 73 shown as two sets of capacitance plates 75 partially surround the vertical container 67 at both ends.

Displacement of the horizontal block 17 of the horizontal meter 13 or the vertical block 69 of the vertical meter 59 or both the horizontal meter 13 and the vertical meter 59 as shown in FIG. 8 will provide electrical values to the computer 36 which have been induced by the vertical and horizontal components of an encountered wind force and direction. The resulting electrical values when transmitted to the computer 36 and evaluated by the computer 36 will indicate in real-time the potential for the onset of adverse wind shear, and indicate to the pilot the need for corrective action.

It is possible to utilize the meter 11 without a computer 36 by connecting an electrical gauge 77 to the bridge circuit 37. The guage 77 is adapted to show acceleration or deceleration and without a computer 36, reflects acceleration or deceleration leaving the pilot to assess if adequate acceleration is being achieved. Such a guage 77, although an improvement over the existing operational practice, is further improved by the inclusion of the computer 36 to accomplish the evaluation.

The operation and use of the invention hereinabove described will be evident to those skilled in the art to which it relates from the consideration of the foregoing period.

It will thus be seen that there is provided a device in which several objects of this invention are achieved and which is well adopted to meet the conditions of practical use. Its advantages are easily seen.

It is thought that persons skilled in the art to which this invention relates will be able to obtain a clear understanding of the invention after considering the foregoing description in connection with the accompanying drawings. Therefore, a more lengthy description is deemed unnecessary.

The invention may be embodied in other specific forms without departing from the spirit or essential characteristics thereof. The present embodiments are, therefore, to be considered in all aspects as illustrative and not restrictive. The scope of the invention is indicated by the appended claims equivalency of the claims are, therefore, intended to be embraced therein.

I claim:

1. An apparatus for determining selectively various operational conditions of an aircraft such as acceleration, deceleration, angle of attack and wind shear, said apparatus comprising:

an elongated container having a substantially constant cross-sectional area, said elongated container being curved along its longitudinal axis, said elongated container containing a fluid;

a block means located within said elongated container and immersed within the fluid contained within the elongated container, the density of the block means being greater than the density of the fluid contained within the elongated container, said block means having substantially the same cross-sectional shape and area as the elongated container and adapted to slide within said elongated container;

an electrical detecting means located about the elongated container between the centerpoint and the end of the elongated container for determining the location of the block means within the elongated container and for supplying an electrical signal to indicate such locate; and an electrical evaluation and indicating means electrically connected to the electrical detecting means and including a selector means to determine which operational condition to evaluate.

2. An apparatus according to claim 1 wherein said electrical evaluation and indicating means includes a guage means connected to said electrical detecting means to measure the electrical signal from the electrical detecting means and convert such electrical signal to a display reflecting acceleration.

3. An apparatus according to claim 1 wherein said electrical evaluation and indicating means includes:
an air speed indicator for supplying an electrical signal indicating air speed;
a data-input console for suppying an electrical signal indicating V(REF) speed and landing distance; and
a computer adapted to receive the air speed signal and the V(REF) data input and the electrical signal from the detecting means to determine the real-time deceleration.

4. An apparatus according to claim 1 wherein said electrical evaluation and indicating means includes:
an air speed indicator for supplying an electrical signal indicating air speed;
a data-input console for supplying an electrical signal indicating V(1) speed and take off distance; and
a computer adapted to receive the air speed signal and the V(1) data input and the electrical signal from the detecting means to determine the real-time acceleration.

5. An apparatus according to claim 1 wherein said electrical evaluation and indicating means includes:
an air speed indicator for supplying an air speed signal indicating the air speed of the aircraft;
a relative wind sensor for supplying a relative wind signal indicating the angle of the wind direction relative to the longitudinal axis of the aircraft;
a computer electrically adapted to receive the air speed signal and the relative wind signal and the signal from the electrical detecting means to determine the angle of attack and
an angle of attack meter connected to the computer to visually indicate the angle of attack determined by the computer.

6. An apparatus according to claim 1 wherein the electrical detecting means includes at least one inductance coil wrapped about the elongated container.

7. An apparatus according to claim 1 wherein the electrical detecting means includes at least one set of capacitor plates.

8. An apparatus for indicating selectively various operational conditions of an aircraft such as acceleration, deceleration, angle of attack and wind shear, said apparatus including:
an elongated container having a substantially constant cross-sectional area, said elongated container being curved along its longitudinal axis, said elongated container containing a fluid;
a block means located within said elongated container and immersed within the fluid contained within the elongated container, the density of the block means being greater than the density of the fluid contained within the elongated container, said block means having substantially the same cross-sectional shape and area as the elongated container and adapted to slide within said elongated container;
a pair of electrical detecting means located about the elongated container, each electrical detecting means being located substantially equally distant from the center point of the elongated container for determining the location of the block means within the elongated container and for supplying an electrical signal to indicate such location; and
an electrical evaluation and indicating means electrically connected to the electrical detecting means and including a selector means to determine which operational condition to evaluate and a computer means to evaluate the electrical signal from each electrical detecting means and means for indicating the operational conditions.

9. A meter according to claim 8 wherein the pair of electrical detecting means includes a pair of inductance coils wrapped about the elongated container.

10. A meter according to claim 8 wherein the pair of electrical detecting means includes a pair of sets of capacitor plates.

11. An apparatus for determining effect of wind shear imposed on the aircraft, said apparatus comprising:
a horizontal elongated container located on the longitudinal axis of the aircraft and having a substantially constant cross-sectional area, said horizontal elongated container being curved along its longitudinal axis, said horizontal elongated container containing a fluid;
a horizontal block means located within said horizontal elongated container and immersed within the fluid contained within the horizontal elongated container, the density of the horizontal block means being greater than the density of the fluid contained within the horizontal elongated container, said horizontal block means having substantially the same cross-sectional shape and area as the horizontal elongated container and adapted to slide within said horizontal elongated container;
a horizontal electrical detecting means located about the elongated container between the centerpoint and the end of the elongated container for determining the location of the horizontal block means within the horizontal elongated container and for supplying an electrical signal to indicate such location;
a vertical elongated container having a substantially constant cross-sectional area, said vertical container being located on the vertical axis of the aircraft;

a vertical block means located within said vertical elongated container, said vertical block means having substantially the same cross-sectional shape and area as the vertical elongated container and adapted to slide within the vertical elongated container;

a spring means located within said vertical elongated container, said vertical block means being mounted within said vertical elongated container by said spring means; and a vertical electrical detecting means located about each end of the vertical container for determining the location of the vertical block means within the vertical elongated container and for supplying air electrical signal to indicate such location.

12. An apparatus according to claim 11 further including:

an air speed indicator for supplying an electrical signal indicating air speed; and a computer connected to said air speed indicator to evaluate said electrical signal indicating air speed and to also evaluate said electrical signal from the horizontal detecting means and the electrical signal from the vertical detecting means to determine the degree of wind shear.

* * * * *